(12) United States Patent
Arora

(10) Patent No.: US 6,403,138 B1
(45) Date of Patent: Jun. 11, 2002

(54) METHOD FOR REFORMING DAIRY PRODUCTS

(75) Inventor: Vijay Arora, Lake Forest, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/627,504

(22) Filed: Jul. 28, 2000

(51) Int. Cl.[7] .............................................. A23C 19/00
(52) U.S. Cl. ....................... 426/516; 426/448; 426/582
(58) Field of Search ................................. 426/512, 516, 426/518, 519, 520, 582, 448

(56) References Cited

U.S. PATENT DOCUMENTS

| | | | | |
|---|---|---|---|---|
| 3,562,910 A | * | 2/1971 | Runge et al. ............... | 426/512 |
| 3,727,308 A | * | 4/1973 | Ross ........................ | 426/516 |
| 4,145,453 A | * | 3/1979 | Lenhardt Sr. et al. ....... | 426/516 |
| 4,185,126 A | * | 1/1980 | Spors ....................... | 426/512 |
| 4,382,969 A | * | 5/1983 | Sadler ...................... | 426/516 |
| 4,620,838 A | * | 11/1986 | Miller et al. ................ | 425/135 |
| 5,192,543 A | * | 3/1993 | Irvin et al. ............. | 425/DIG. 13 |
| 5,768,970 A | * | 6/1998 | Wolf et al. ................. | 83/701 |
| 5,925,398 A | * | 7/1999 | Rizvi et al. ................ | 426/516 |

OTHER PUBLICATIONS

Dukane Ultrasonics brochure, 1996 (5 pages).*
Polar Process Incorporated web pages, 1998 (11 pages).*

* cited by examiner

*Primary Examiner*—George C. Yeung
(74) *Attorney, Agent, or Firm*—Fitch, Even, Tabin & Flannery

(57) ABSTRACT

A method and apparatus for reforming small pieces of natural cheese or other dairy products, such as shreds, trim, or offcuts, wherein the small pieces are fed through a mechanical pump and a die that form the product into a cohesive larger chunk. The mechanical pump and the die operate such that natural cheese pieces may be formed into a larger chunk of natural cheese having a very similar texture and appearance to that of the original product.

16 Claims, 4 Drawing Sheets

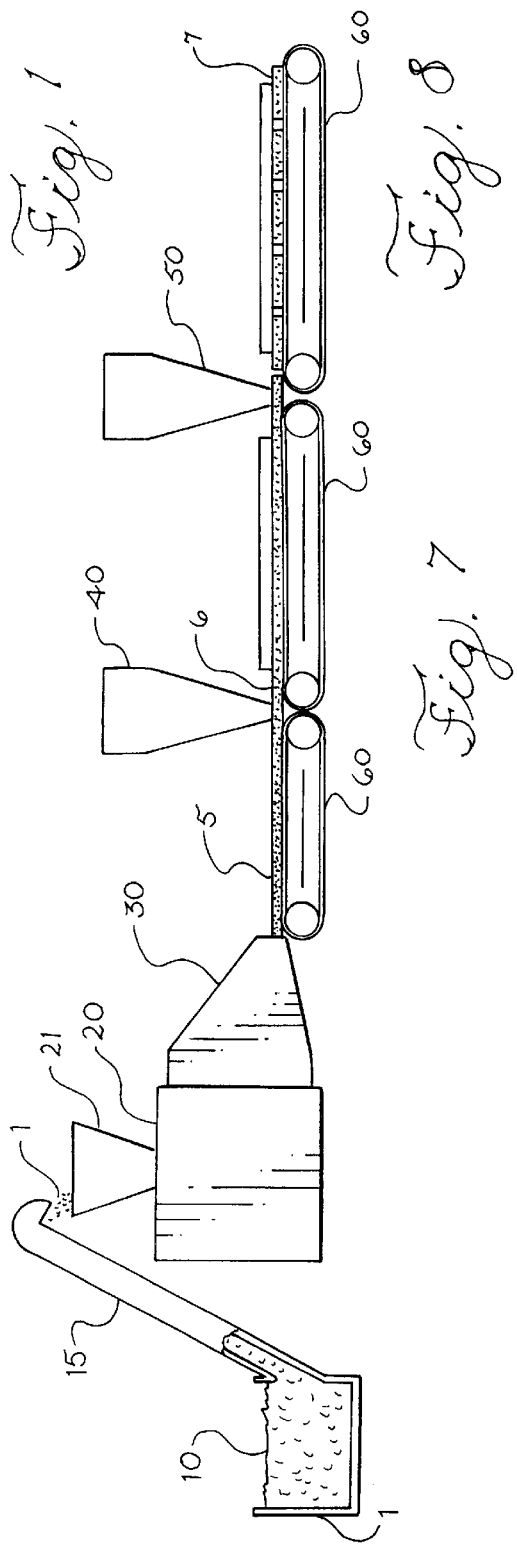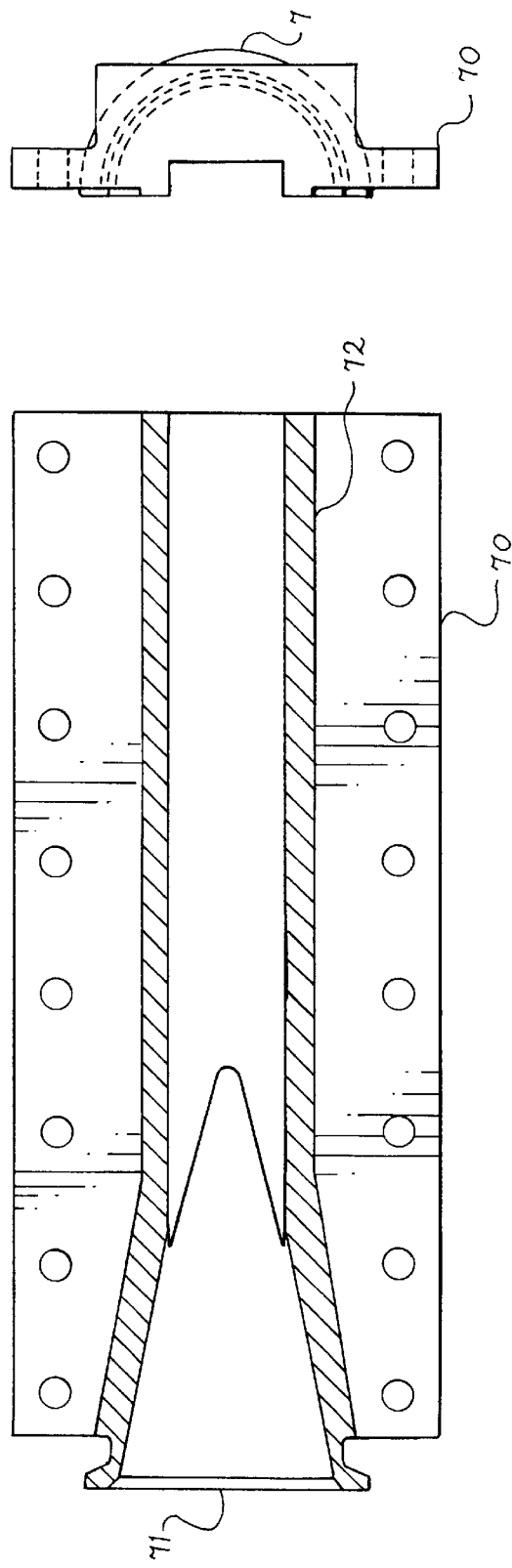

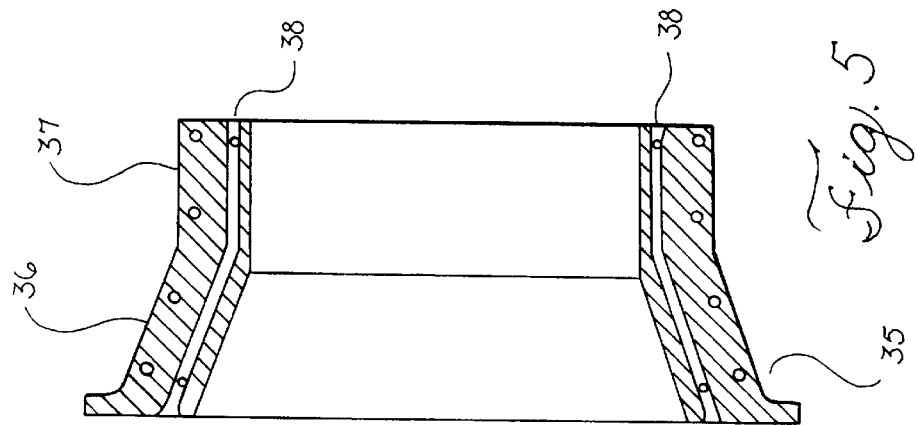
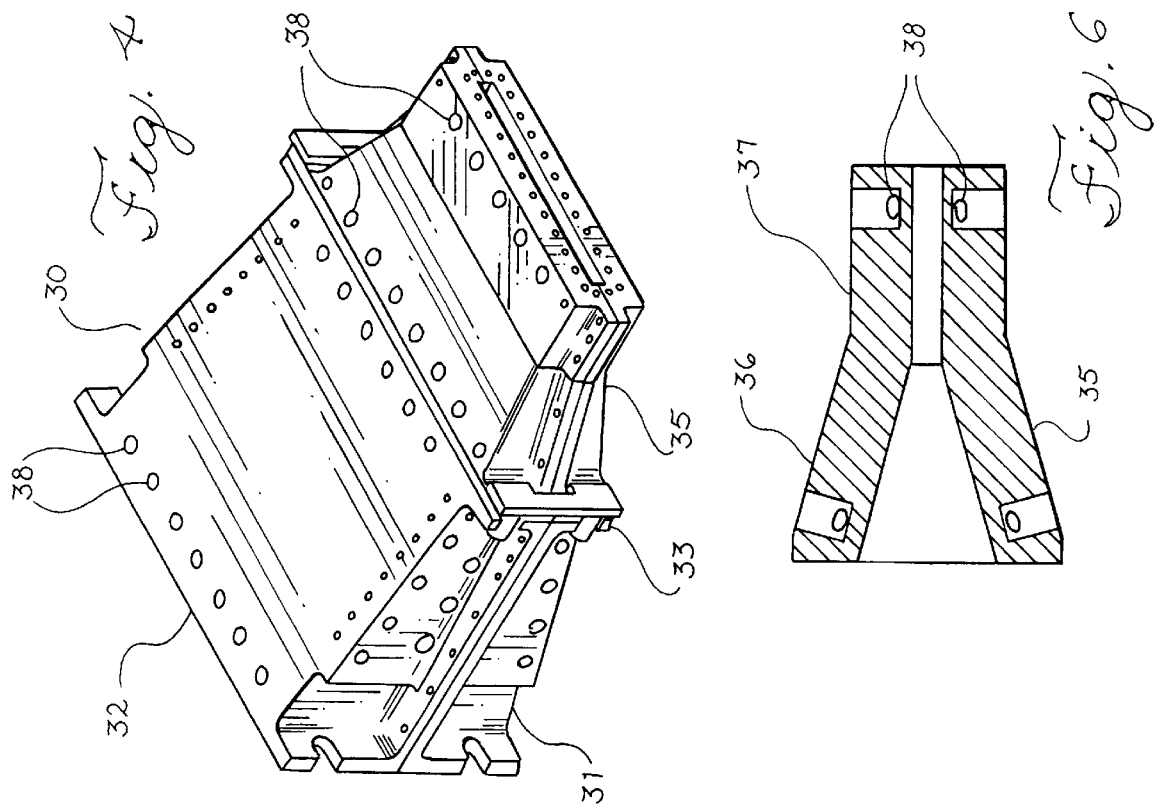

METHOD FOR REFORMING DAIRY PRODUCTS

BACKGROUND OF THE INVENTION

The invention relates generally to dairy products, and particularly to methods and apparatus for reforming cheese products and other dairy products.

In the manufacture of chunk cheese products, large blocks of natural cheese weighing on the order of about 600 to 700 lbs. are divided into smaller chunks for retail sale. Parts of the large blocks are left as irregularly shaped pieces, referred to as trim or offcuts.

In the past, such pieces have often been used as ingredients for process cheese, or have been formed into shreds. However, the value of the resulting product, be it shredded cheese or process cheese, is generally lower than the value of blocks or chunks of natural cheese. Substantial effort has been devoted to developing methods for reforming such pieces into larger blocks of natural cheese. It is believed that combining small pieces into a cohesive larger chunk requires a certain amount of working of the cheese. Without sufficient working, the end product may not be cohesive, i.e., the chunk may have visible divisions, and may separate along such divisions or crumble when sliced or otherwise handled by the consumer. Excessive working, however, results in "oiling off", i.e., separation of oil, and/or maceration, resulting in an unacceptable end product. One aspect of the invention is to provide a method and apparatus for reforming small cheese pieces such as trim or offcuts, and/or other dairy products, into chunks of natural cheese, or into other solid, cohesive dairy products of firm texture, without maceration or separation of oil.

Ross, U.S. Pat. No. 3,727,308, discloses apparatus for reconstituting cheese trimmings into a solid block. Cheese trimmings are placed in a hopper and forced through holes in a plate under the action of an auger and knife.

Sadler, U.S. Pat. No. 4,382,969, discloses a method for treating cheese off-cuts wherein the off-cuts are first cut into small chips, and then pressed in an evacuated environment to form a reconstituted block of cheese. Sadler states that the apparatus described in the above-discussed Ross patent has several drawbacks in that the displacement of the trimmings using a helical auger results in considerable working of the cheese which can detract from the characteristics of the end product. The apparatus of Sadler employs a ram, rather than an auger, to advance the cheese. In Sadler, the cheese undergoing processing remains in the range of 8° C. to 12° C. This temperature control is achieved, if necessary, by including a cooling jacket around the nozzle 32 at the outlet end of the equipment.

U.S. Pat. No. 4,185,126, discloses a process of reconstituting cheese trimmings into horns by grinding the trimmings into a particulate mass at a temperature which inhibits bacteria growth, then ramming the particulate mass into a closed mold.

Runge et al., U.S. Pat. No. 3,562,910, discloses a method for manufacture of natural cheese from curd. The Runge apparatus includes a curd transfer device that includes a pair of co-acting helical cams and a close fitting housing therefor. The helical cams are shown as intermeshing. In the Runge patent, the cams force the curd into a forming tube to establish knitting. The tube appears to be of uniform circular cross-section. Its length is about 5 feet to 20 feet. Heating of the tube to a temperature sufficient to melt the fat of the cheese curd is said to cause oiling off which effects lubrication of the walls of the tube and lowers the effective resistance of the tube. This patent states that undue oiling off is undesirable, and that the temperature of the tube surface adjacent to the cheese should not exceed about 160° F.

Miller et al., U.S. Pat. No. 4,620,838, assigned to Kraft, Inc., discloses use of a ram for forcing cheese through a perforated die plate to form shreds.

U.S. Pat. No. 5,768,970 discloses an ultrasonic cutting system for cutting of foodstuffs including cheese.

It is a general object of the invention to provide a novel and improved method and apparatus for reforming small pieces of cheese or other dairy product into larger chunks with appearance, taste and texture similar to fresh cut natural chunks or other products having enhanced value.

SUMMARY OF THE INVENTION

In accordance with the invention, a method and apparatus for reforming small pieces of natural cheese or other dairy products, such as shreds, trim, or offcuts, are provided wherein the small pieces are fed through a mechanical pump and a die that form the product into a cohesive larger chunk. The mechanical pump and the die preferably operate such that natural cheese pieces may be formed into the larger chunk of natural cheese having a very similar texture and appearance to that of the original product.

In a preferred embodiment of the invention, the mechanical pump mixes and folds the small pieces of cheese or other dairy products into a viscous mass without excessive separation of oil. More particularly, the mechanical pump in the preferred embodied produces a viscous mass with virtually no separation of oil. Any oil that does separate from the product is of a minimal amount, e.g., less than 0.1% of the oil in the cheese pieces. The mechanical pump then feeds the viscous mass through the die. The die preferably has a region of substantially uniform cross-section. The ratio of the length of the region to its smallest cross-sectional dimension, e.g., its height, is preferably about 4:1. The region of substantially uniform cross-section is maintained at an elevated temperature to reduce drag and improve the appearance of the end product.

The method and apparatus of the invention preferably enables offcuts, trim and other small pieces of natural cheese or other dairy products to be reformed into cohesive larger chunks of natural cheese, without addition of water, salt or other ingredients, and without separation of oil or maceration. The configuration and speed of operation of the mechanical pump are selected so that it does not overwork the smaller pieces when mixing and folding them into a viscous mass. The substantially uniform region of the die forms the viscous mass into the desired shape with well defined edges. The die temperature reduces friction and produces a thin surface seal about the exterior surface of the larger chunk without excessive separation of oil from the surface of the larger chunk.

In the preferred embodiment of the invention, the extrudate is fed through one or more slitting and cutting stations after emerging from the die. The slitting and cutting stations preferably use ultrasonic cutters to leave clean, smooth, sealed edges with no fines and a thin surface seal to minimize moisture or volatile losses as well as enhance the product appearance.

BRIEF DESCRIPTION OF THE DRAWINGS

FIG. 1 is an elevational view of apparatus for reforming pieces of natural cheese or other dairy products into cohesive larger chunks in accordance with a first embodiment of the invention.

FIG. 4 is a perspective view of the die of FIG. 2.

FIG. 5 is a sectional view taken substantially along lines 5—5 in FIG. 3.

FIG. 6 is a sectional view taken substantially along lines 6—6 in FIG. 2

FIG. 7 is an sectional view illustrating a die half in accordance with a second embodiment of the invention.

FIG. 8 is an end view of the die half of FIG. 7.

DETAILED DESCRIPTION OF THE PREFERRED EMBODIMENTS

Figure 2:
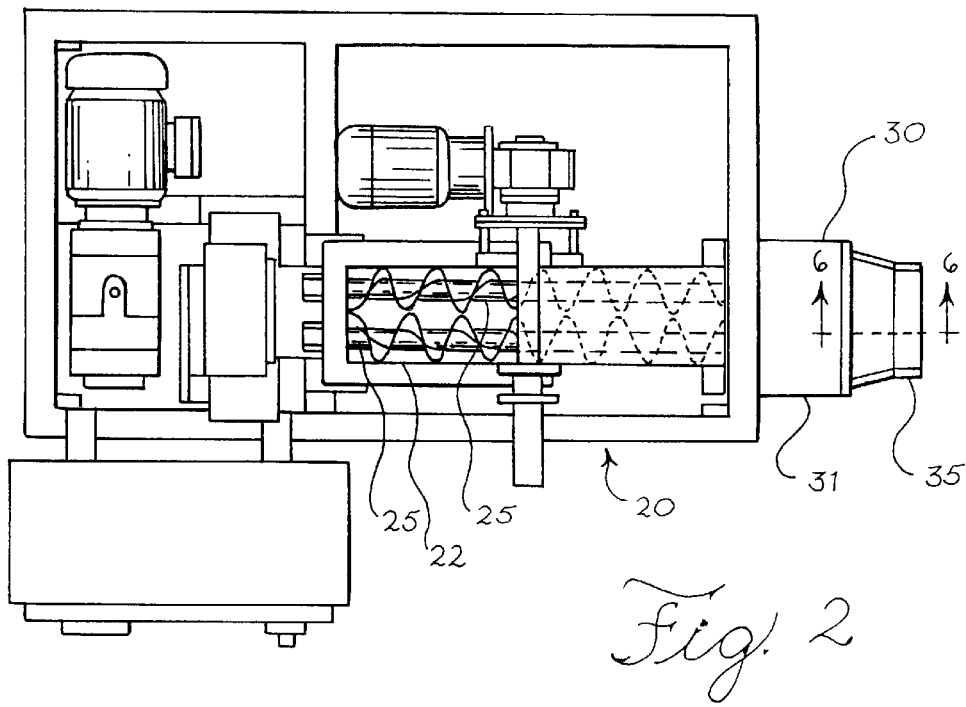
FIG. 2 is a plan view of the mechanical pump and die of FIG. 1.

The invention is preferably embodied in a method and apparatus for reforming pieces of natural cheese or other dairy products 1 into cohesive chunks or bars 7. A preferred embodiment of the invention, wherein small pieces of natural cheese 1 such as trim or offcuts are reformed into bars 7 for retail sale is disclosed below FIG. 1 illustrates apparatus for reforming small pieces of natural cheese or other dairy products 1 into cohesive larger chunks 7. The small pieces of cheese or other dairy products 1 are placed in an intake bin 10 adjacent to a mechanical pump 20. Located above the mechanical pump 20 is a hopper 21 for feeding the small pieces 1 into the mechanical pump 20. A conveyor 15 between the intake bin 10 and the hopper 21 transfers the small pieces 1 from the intake bin 10 to the hopper 21.

After entering the hopper 21, the small pieces 1 enter the mechanical pump 20, where they are mixed and folded together without any visible separation of oil, then formed by a die 30 into a continuous sheet 5 of predetermined cross-section. The continuous sheet 5 exits the die 30 onto a conveyor 60. The conveyor 60 moves the sheet 5 past a slitting station 40 where the sheet 5 is separated into longitudinal strips 6, then to a cross cutting station 50 where the strips 6 are cut into cheese bars 7. The conveyor 60 then moves the cheese bars 7 to a delivery station.

Figure 3:
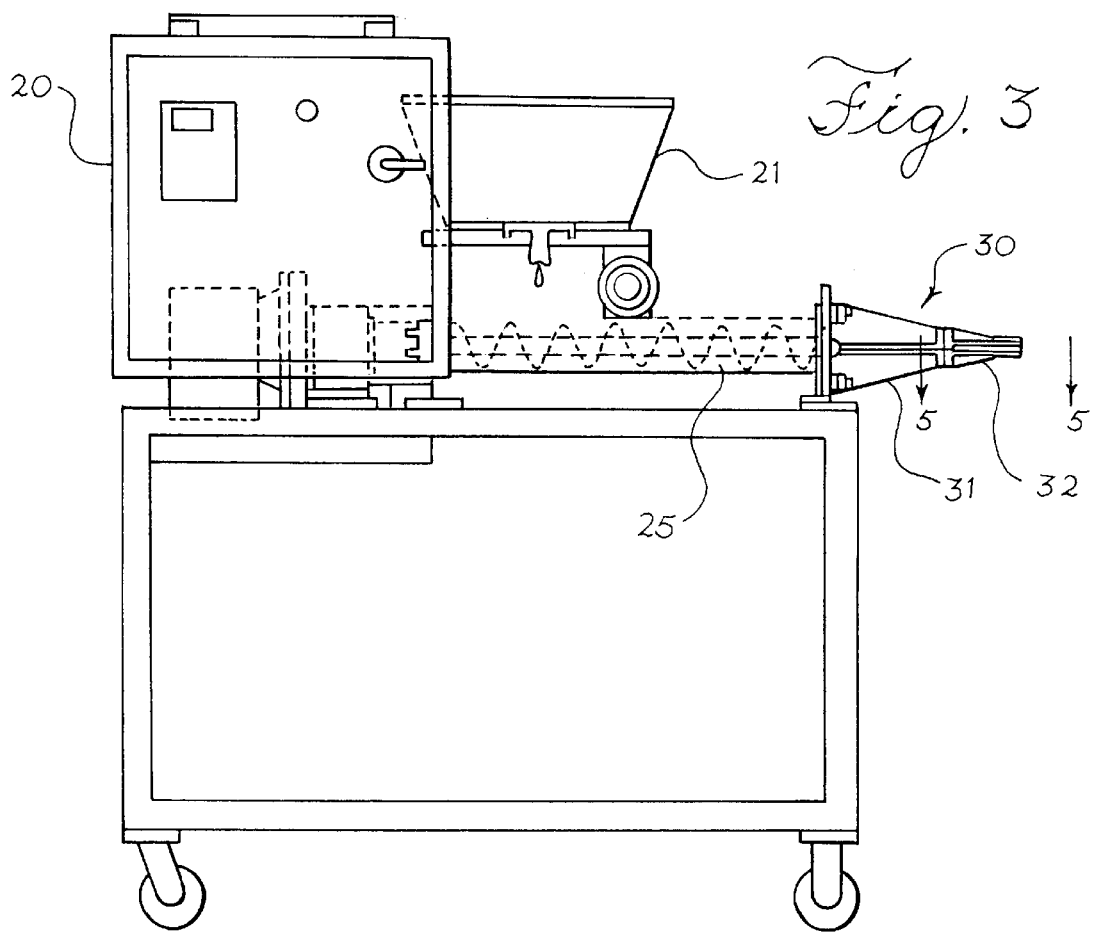
FIG. 3 is an elevational view of the mechanical pump and die of FIG. 2.

In the preferred embodiments of the invention, the mechanical pump 20 has a pump chamber 22 that is fed by the hopper 21 as illustrated in FIG. 3. Inside the pump chamber 22 are two non-intermeshing augers 25 as illustrated in FIGS. 2 and 3. The rotation of the augers 25 mixes and folds the small pieces of cheese or other dairy products 1 while forcing them through the die 30. In one particular embodiment of the invention, the pump 20 may comprise a commercially available pump, Polar Pump Model 352, manufactured by Polar Process Incorporated of Plattsville, Ontario. Each of the augers 25 preferably has an outer diameter of between 3 and 4 inches, an inner diameter or shaft diameter of between 1 and 2 inches, and a pitch of between 3 and 4 inches. The augers are preferably rotated at a rate less than 21 rpm. The rate of rotation is preferably between 7 rpm and 21 rpm.

The die 30 comprises a compressing die portion or transition section 31 and a forming die portion 35 as illustrated in FIG. 4. The compressing die portion 31 narrows from a compressing die intake end or mouth 32 to a compressing die outlet 33. Attached to the compressing die outlet 33 is the forming die 35. The forming die 35 has a narrowing section 36 and a straight section 37 as illustrated in FIG. 6. The narrowing section 36 decreases in cross-section toward the straight section 37 preferably from 10 by 1 inches to 8 by 0.50 inches as illustrated in FIG. 5. The straight section 37 has a substantially uniform cross-section. The ratio of the length of the straight section 37 to its smallest cross-sectional dimension may be at least 2:1 and less than 6:1, and may be between 3:1 and 5:1. In the preferred embodiment, the ratio is 4:1.

Both the compressing die 31 and the forming die 35 have drilled internal passages 38 for the circulation of fluid around each die 31 and 35 as illustrated in FIGS. 4–6. The flow of fluid through the passages 38 allows for the dies 31 and 35 to be maintained at a desired temperature The desired temperatures in preferred embodiments of the invention are between 85° and 100° F. The desired temperature can also be between 85° and 95° F. and between 88° and 92° F. The provision of drilled internal passages 38, rather than a water jacket, is believed to provide a more reliable means of controlling and maintaining a uniform temperature without leakage of heat transfer fluid.

Figure 9:
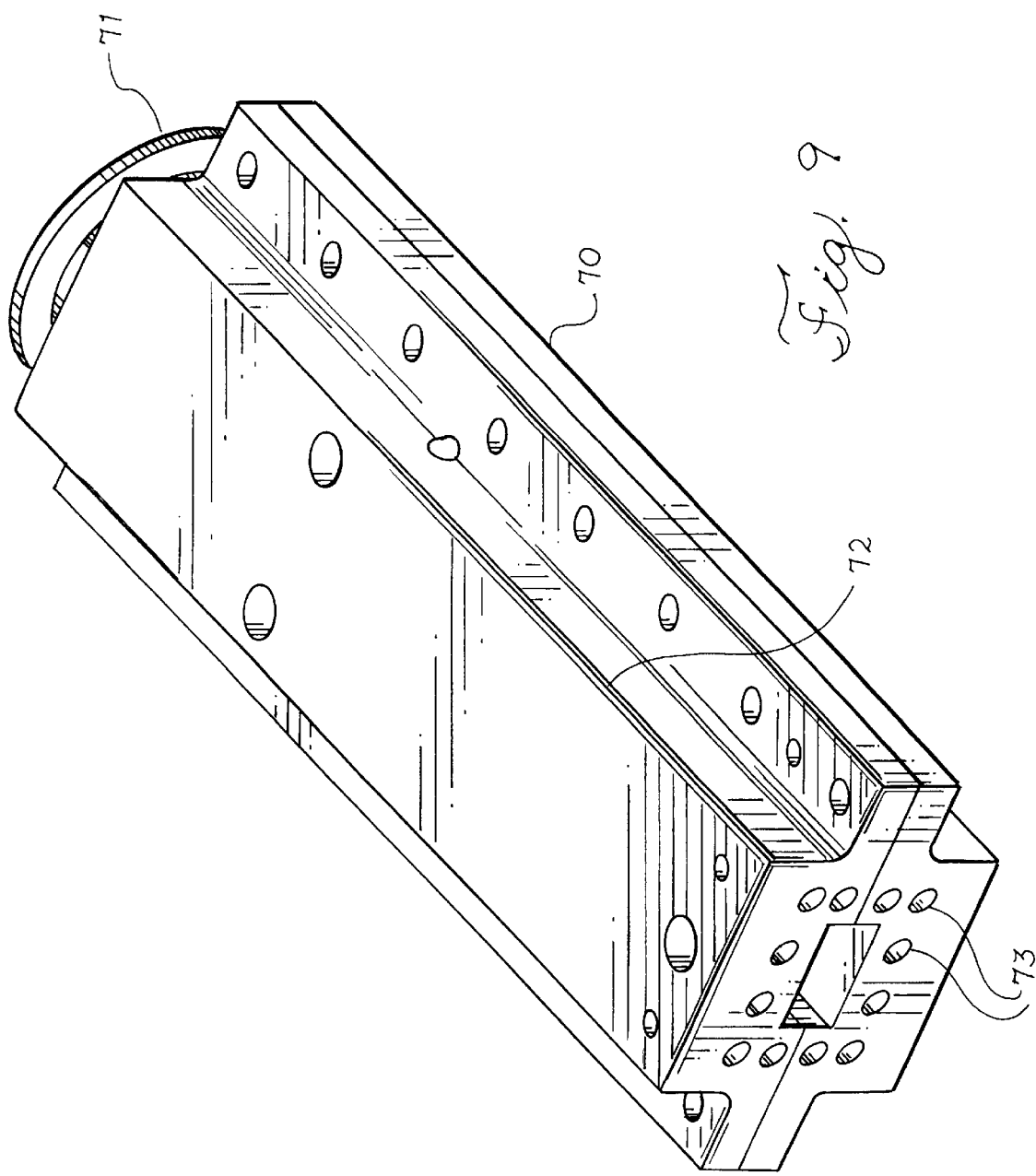
FIG. 9 is a perspective view of the die of the second embodiment.

In a second embodiment of the invention, a combination die 70, illustrated in FIGS. 7–9, replaces the compressing die 31 and forming die 35. The combination die 70 has a circular mouth 71 that conically narrows and transitions to a rectangular straight section 72. The combination die 70 has internal passages 73 for the flow of fluid around the die 70. The flow of fluid through the passages 73 allows the die 70 to be maintained at a desired temperature. The desired temperatures in preferred embodiments of the invention are between 85° and 100° F. The desired temperature can also be between 85° and 95° F. and between 88° and 92° F. In the preferred embodiments of the invention, the slitting station 40 comprises seven ultrasonic slitting horns vibrating at 20 kHz. The slitting horns are spaced one inch apart. The cutting station 50 comprises an ultrasonic guillotine horn. The guillotine horn is twelve inches long. In one particular embodiment of the invention, the ultrasonic horns for the slitting station 40 and the cutting station 50 are manufactured by Dukane Corporation of St. Charles, Ill.

EXAMPLE 1

Natural shreds of mild cheddar cheese 1 are fed into the hopper 21 located above the mechanical pump 20 so that the shreds form a bed in the pump chamber 22 with a depth of about 2 to 4 inches from the uppermost edges of the augers 25. A forming die 35 with an 8 by ½ inch opening is attached to the exit end of the mechanical pump 20. The forming die 35 is equipped with a hot water re-circulating jacket and water is circulated through the jacket at a temperature of 91° F. The augers 25 of the mechanical pump 20 are operated at 7 rpm to gently mix, knead, and compact the shreds 1 into the forming die 35. The shreds 1 are shaped by the forming die 35 and exit the die 35 in a continuous sheet 5. The reformed cheese product 7 has a smooth surface finish and well defined edges. The product appearance and sensory attributes are very much like those of fresh cut natural chunks. The throughput rate is about 285 lb/hr.

EXAMPLE 2

Natural shreds of mild cheddar cheese 1 are reformed into a continuous sheet of cheese 5 in a similar manner as in EXAMPLE 1. Ultrasonic horns of the slitting station 40 and the cross-cutting station 50, operating at a frequency of 20 kHz, then cut the sheet 5 into 1 by 3 by ½ inch bars 7. The ultrasonic horns leave the edges of the bars 7 clean and smooth with no fines. The ultrasonic horns also give the cut surfaces a thin compression seal which minimizes moisture or volatile losses and enhances the appearance of the bars 7. The frequency of the ultrasonic horns also destroys vegetative cells that may reside on the horns, thus minimizing the risk that microbial contaminants will be carried from one bar to the next.

EXAMPLE 3

Natural shreds of mild cheddar cheese 1 are reformed into cheese bars 7 in a similar manner as in EXAMPLE 2, except that the pump speed is increased from 7 rpm to 14 rpm. The throughput rate is about 525 lb./hr. The product density is approximately 0.620 oz/in$^3$ (1.08 g/cc). The appearance, texture, and sensory attributes of the bars 7 are like fresh cut natural cheddar chunks.

EXAMPLE 4

Natural shreds of mild cheddar cheese 1 are mixed with approximately 4% calcium sulfate dihydrate powder in a tumbling drum, obtaining an essentially uniform distribution of powder on the cheese shreds 1. The cheese shreds 1 are then reformed into cheese bars 7 in a similar manner as in EXAMPLE 3. The product density is approximately 0.650 oz/in$^3$ (1.13 g/cc). The appearance, texture, and sensory attributes of the bars 7 are like fresh cut natural cheddar chunks.

EXAMPLE 5

Natural shreds of mild cheddar cheese 1 are reformed into a continuous sheet of cheese 5 in a similar manner as in EXAMPLE 1, except that the pump speed is increased from 7 rpm to 21 rpm. The cheese sheet 5 shows a thin film of oil on the surface. The cheese sheet texture was soft and creamy. This indicates that the cheese has undergone shear thinning and breakdown of curd leading to a soft, creamy texture similar to processed cheese. The cheese sheet 5 is noticeably different from fresh cut natural cheese chunks.

From the foregoing, it will be appreciated that the invention provides a method and apparatus for reforming pieces of natural cheese or other dairy products into cohesive chunks or bars. The invention is not limited to the embodiments described hereinabove or to any particular embodiments. Various additional steps may be combined with the processes described above. For example, herbs, spices, vitamins, calcium or other minerals may be added to the reformed cheese bars in a similar manner as the calcium sulfate dehydrate described in EXAMPLE 4.

The invention may be embodied in processes for generating end products of various sizes and shapes, including but not limited to snack cubes, e.g., ⅝ in. cubes, bars of triangular cross section, wedges, rings, stars, and 5.6 by 2.2 by 1.6 inch, eight ounce chunks or larger reformed chunks.

The invention is defined more particularly by the following claims.

What is claimed is:

1. A method of reforming, sizing and shaping cheese pieces into a cheese bar of predetermined length having a substantially linear longitudinal axis comprising:
   mixing, compacting and reforming pieces of natural cheese into a solid, cohesive, substantially uninterrupted mass of cheese; extruding the cheese mass through a die having a region of substantially uniform cross-section; and forming the cheese mass into a cheese bar of predetermined length having a substantially linear longitudinal axis;
   the ratio of the length of said region of substantially uniform cross-section to its smallest cross-sectional dimension being at least 2:1.

2. The method in accordance with claim 1 wherein said ratio is between 2:1 and 8:1.

3. The method in accordance with claim 1 wherein said region is maintained at a temperature of between 85° and 100° F.

4. The method in accordance with claim 1 wherein said region is maintained at a temperature of between 85° and 95° F.

5. The method in accordance with claim 1 wherein said region is maintained at a temperature of between 88° F. and 92° F.

6. The method in accordance with claim 1 wherein said region is heated to a temperature sufficient to reduce drag and to produce a thin surface seal about the exterior surface of the extrudate without excessive separation of oil therefrom.

7. A method of reforming, sizing and shaping cheese pieces into a cheese bar of predetermined length comprising:
   mixing, compacting and reforming pieces of natural cheese into a solid, cohesive, substantially uninterrupted mass of cheese;
   extruding the cheese mass through a die;
   forming the cheese mass into a cheese bar of predetermined length; and
   heating a region of said die to a temperature sufficient to reduce drag and to produce a thin surface seal about the exterior surface of the extrudate without excessive separation of oil therefrom.

8. The method in accordance with claim 7 wherein said region is maintained at a temperature of between 85° and 100° F.

9. The method in accordance with claim 7 wherein said region is maintained at a temperature of between 85° and 95° F.

10. The method in accordance with claim 7 wherein said region is maintained at a temperature of between 88° F. and 92° F.

11. The method in accordance with claim 7 wherein the mass is free of added water or salt.

12. The method in accordance with claim 7 further comprising controlling die temperature by circulating fluid through drilled internal passages in said die.

13. The method in accordance with claim 12 wherein mixing, compacting and reforming pieces of natural cheese into a solid cohesive substantially uninterrupted mass of cheese, and extruding the cheese mass through a die, comprises use of a low shear, non-intermeshing twin auger pump.

14. The method in accordance with claim 13 wherein the cheese pieces comprise shreds.

15. The method in accordance with claim 14 further comprising feeding the mass of cheese to a slitter;
   slicing the cheese mass into strips with the slitter;
   feeding the cheese strips to a cross cutter; and
   cutting the cheese strips into cheese bars with the cross cutter.

16. The method in accordance with claim 15 wherein slitting and cross cutting comprises use of ultrasonic horns to leaves clean, smooth sealed edges and a thin surface seal to minimize moisture losses and to as enhance the product appearance.

* * * * *